July 3, 1951 (RALPH VIDAR) INGEMAR TAEGTSTROEM 2,559,480
INSTRUMENT CASE CONSTRUCTION
Filed Oct. 5, 1946
3 Sheets-Sheet 1
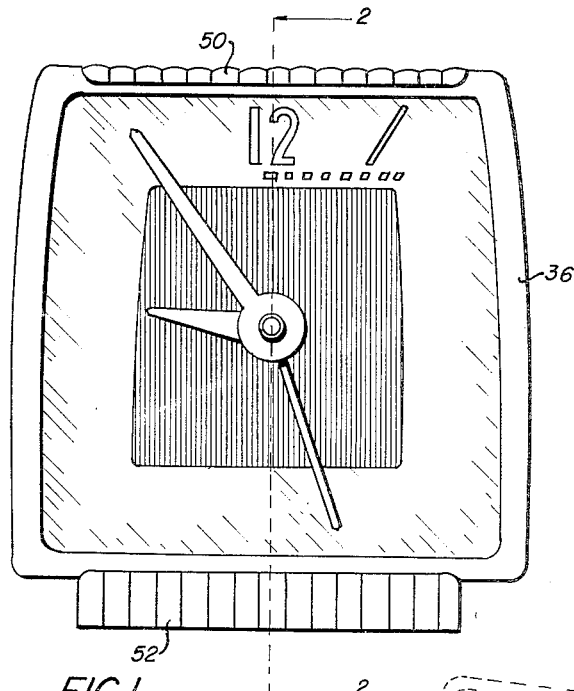
FIG.1
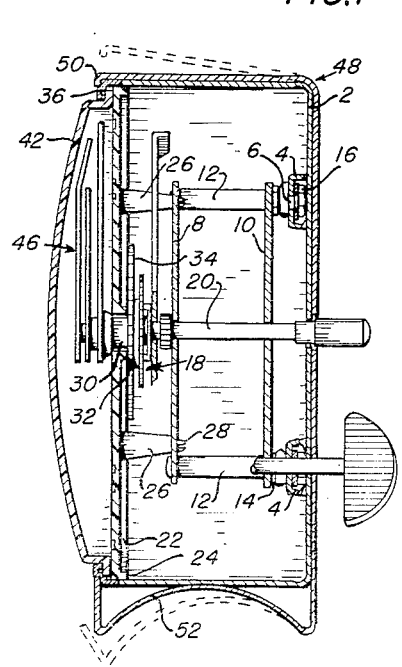
FIG.2
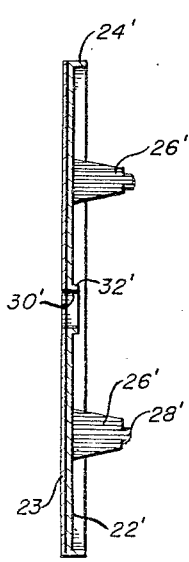
FIG.6
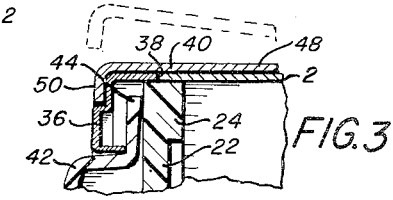
FIG.3
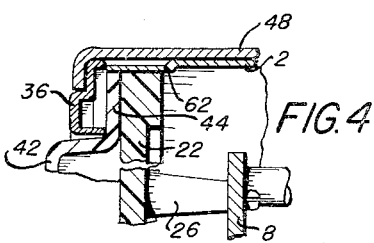
FIG.4
FIG.5
INVENTOR.
(RALPH VIDAR) INGEMAR TAEGTSTROEM
BY
ATTY.

July 3, 1951 (RALPH VIDAR) INGEMAR TAEGTSTROEM 2,559,480
INSTRUMENT CASE CONSTRUCTION
Filed Oct. 5, 1946 3 Sheets-Sheet 2
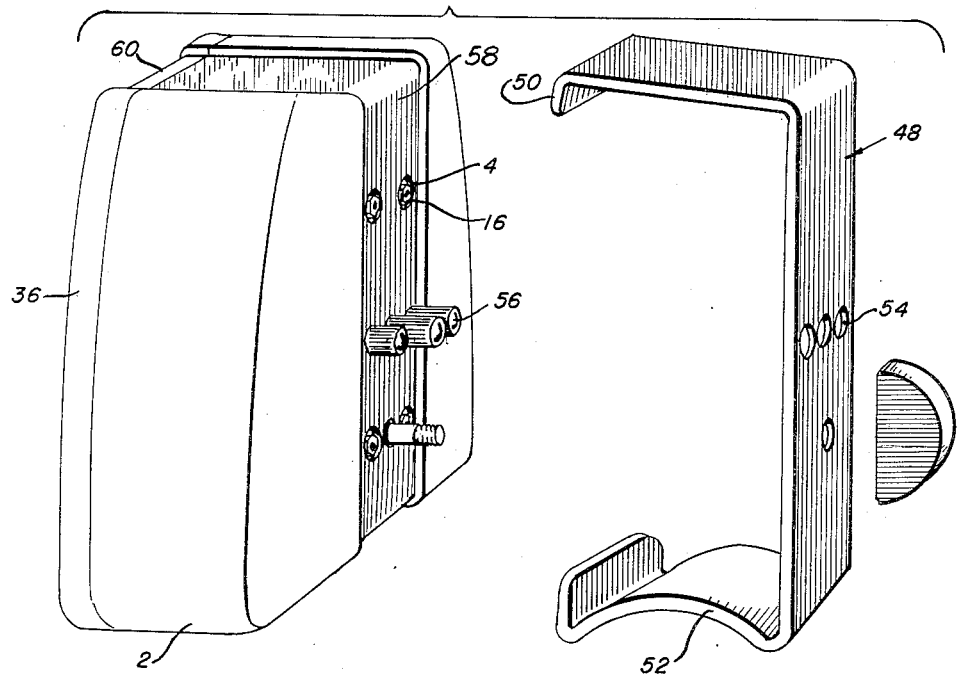
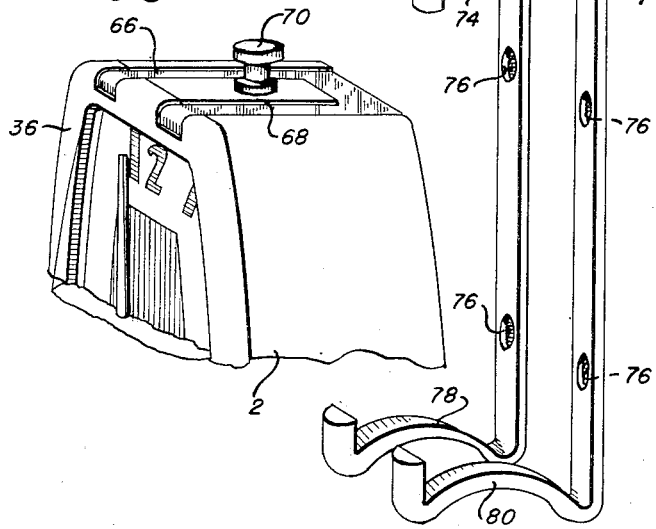
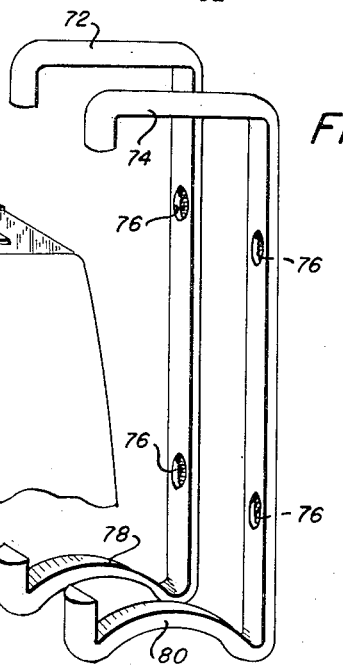
INVENTOR.
(RALPH VIDAR) INGEMAR TAEGTSTROEM
BY:
ATTY.

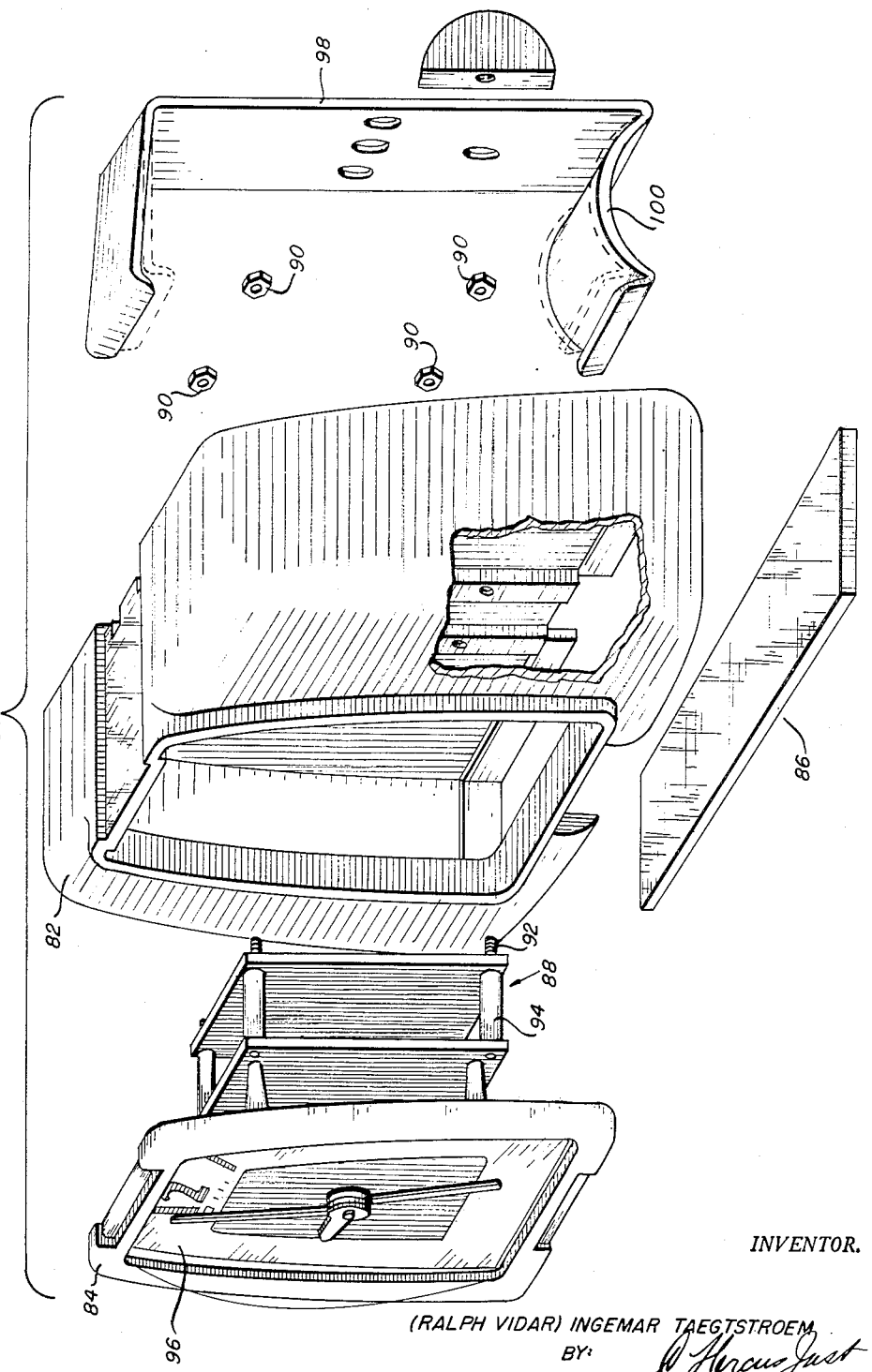

Patented July 3, 1951

2,559,480

UNITED STATES PATENT OFFICE 2,559,480

INSTRUMENT CASE CONSTRUCTION (Ralph Vidar) Ingemar Taegtstroem, Waterbury, Conn., assignor to The United States Time Corporation, Waterbury, Conn., a corporation of Connecticut Application October 5, 1946, Serial No. 701,616

10 Claims. (Cl. 58—53)

This invention relates in general to an instrument case and particularly to an instrument case composed of two or more parts, all of which are held together by a single clamping means, which clamping means also may serve as a base upon which said case rests.

It is an object of this invention to provide an instrument case which will be attractive in appearance and inexpensive to manufacture in view of the elimination of certain manual assembly operations heretofore required.

It is a further object of this invention to provide a case for housing an instrument and wherein the instrument is fastened to the case by means which will not be visible after the case has been completely assembled.

It is a still further object of this invention to provide an improved dial plate for an instrument, which dial plate will serve the function of holding certain of the components of the instrument in position and will also serve to align certain of the parts of the case.

These and further objects of the invention will more readily appear as the description of the invention proceeds.

Referring now to the drawings wherein:

Fig. 1 is a front elevational view of the completely assembled instrument case of this invention.

Fig. 2 is a sectional view taken on the line 2—2 of Fig. 1.

Fig. 3 is a detailed view of certain of the parts of this invention.

Fig. 4 is a detailed view of an alternative form of construction according to this invention.

Fig. 5 is a detailed view of a still further embodiment of this invention.

Fig. 6 is an edge elevation view, partly broken away, of one form of dial plate according to this invention.

Fig. 7 is an exploded view of a case made according to this invention, showing the last step in the assembling of the case.

Fig. 8 is a perspective view showing another embodiment of this invention.

Fig. 9 is a perspective view of certain of the elements of a still further embodiment of this invention.

Fig. 10 is an exploded view of a still further embodiment of this invention.

The particular instrument chosen for illustration is a clock, but it will readily be appreciated that the invention is equally applicable to any number of other instruments.

Referring now to that form of the invention shown in Figs. 1, 2, 3, and 7, the major portion of the case is indicated at 2, and as seen in Figs. 2 and 7, said member 2 is cup-shaped or shell-like. The back of the shell-like member is provided with a plurality of indentations 4, having openings 6 in the bottom thereof for a purpose to be presently described.

The instrument referred to herein and in the appended claims is housed within the case and is provided with a front frame plate 8 and a rear frame plate 10 spaced apart by a plurality of pillars 12. The pillars 12 extend longitudinally beyond the rear frame plate 10 and are provided with nuts 14 for holding the rear frame plate in position upon the pillars.

The longitudinally extended ends of the pillars 12 are provided with threads and are projected through the openings 6 in the rear case member 2 and are securely connected to said case member by nuts 16. The nuts 16, when threaded upon the ends of the pillars 12, serve as a means to properly position the instrument within the case member 2, and as will be seen from Fig. 2, the nuts 16 and the longitudinally extending ends of the pillars are located within the indentations 4 of the back case member 2 in such manner as to be below the normally flat back surface of the case. Of course, the nuts 16 are merely illustrative of one form of securing means, and it will readily be appreciated that any suitable means may be employed without departing from the spirit of the invention.

Most of the operating parts of the instrument have been omitted since they form no part of the present invention. However, the dial train of the instrument has been shown and the same is generally indicated in Fig. 2 at 18. Only so much of the dial train as is mounted upon the center arbor 20 has been shown since that is the only part which is relevant so far as this invention is concerned.

At 22 is indicated a dial member having a peripheral flange 24. The particular dial member illustrated in Fig. 2 is a planar member molded of plastic material, of which synthetic resin is one example, and has a plurality of integrally molded positioning means 26 extending substantially normal to the rear face thereof. The positioning means 26 are provided on their outer ends with ears 28 which extend loosely through openings provided therefor in the front frame plate 8. The positioning means 26 serve to properly space the dial plate 22 from the front frame plate 8, as will presently be explained. The molded plastic dial plate is provided with an opening 30 near the center thereof for accommodating the center arbor 20 and a rearwardly projecting flange 32 is provided adjacent the opening 30. The flange 32 engages one of the components 34 of the dial train to hold the dial train in position upon the center arbor. The face of the dial plate has molded therein appropriate indicia, depending upon the particular type of instrument which is to be housed within the case.

In Fig. 6 is shown an alternative form of dial member 22'. The dial member 22' is a planar member formed of sheet steel or other suitable material, provided with a peripheral flange 24' and has positioning means 26' struck out from the back thereof. The positioning means 26' are provided with ears 28' corresponding to the ears 28 of the dial member 22. The dial member 22' is also provided with a central opening 30' having a rearwardly extending flange 32' therearound. Since the positioning means 26' are struck out from the member 22', thereby leaving openings through said member 22', a paper indicia carrying member 23 is glued, or otherwise fixed, to the front face of the member 22'. In the various arrangements hereinafter described, the dial member 22' may be substituted for the dial member 22.

The case according to this form of the invention is made in two parts, and as previously pointed out, the rear member of the case is designated at 2 and is in the form of a shell-like member having an open front. The front member, or bezel, is indicated at 36 and as most clearly seen in Fig. 3, the rear edge 38 of the bezel 36 abuts the forward edge 40 of the rear case member 2.

The crystal is indicated at 42 and is provided with a peripheral flange 44 which is held in position against the front of the dial plate 22 by the bezel 36. The time or other indicating hands are generally indicated at 46 in Fig. 2.

A resilient C-shaped clamping member is generally indicated at 48, and as best seen in Figs. 2 and 3, said C-shaped clamping member is provided with a downwardly turned lip 50 along the forward top edge thereof and is provided with an arcuate portion 52 at the bottom thereof for a purpose to be presently described. As seen in Fig. 7, the C-shaped member 48 is provided with a plurality of openings 54 for accommodating the usual control means 56 which extend through the rear case member 2.

In assembling the parts thus far described, the instrument is placed within the rear case member 2 and the longitudinally extending ends of the pillars 12 are made fast with the case member 2 by means of the nuts 16 as aforesaid. The dial member 22 is then placed in position upon the front frame plate 8 of the instrument in such manner that the positioning means 26 bear against the front frame plate 8 and the flange 24 of the dial plate 22 is partly telescoped within the open front of the case member 2, as best seen in Figs. 2 and 3. The hands 46 are then mounted in front of the dial plate 22, and the crystal 42 is placed over the hands in such manner that the peripheral flange 44 thereof rests upon the dial member. The bezel 36 is then partially telescoped over the peripheral flange 24 in such manner that rear edge 38 of the bezel 36 abuts the forward edge 40 of the rear case member 2. It is to be noted that during this assembly operation, the flange 24 of the dial member 22 serves as a means for properly aligning the front and rear case members. It is to be here noted that the flange 24 may be dispensed with by making the dial member 22 thicker over its entire area. The important thing is that the dial member have an appreciable peripheral area to serve as an aligning means for the front and rear case members. The C-shaped clamping member 48 is then snapped around the case members 2 and 36 in such manner as to hold the two members in assembled relation. As will be seen from Fig. 2, the lip 50 of the C-shaped clamping member 48 and the forward edge of bottom 52 of the C-shaped clamping member will hold the bezel 36 firmly against the crystal 42, which will in turn bear against the dial member 22 in such manner that the flange 32 around the central opening 30 of the dial member will hold the dial train 18 in place by preventing the component 34 of the dial train from moving outwardly. The positioning means 26 prevent the dial member 22 from being pressed so close to the front frame plate 8 as to interfere with the free rotation of the various components of the dial train.

If desired, the forward component 34 of the dial train may be provided with a forwardly extending collar to bear against the back of the dial member 22, in which instance the flange 32 would of course be omitted from the back of the dial member since the purpose of the flange 32 is to present a lessened bearing area to the component 34.

The C-shaped clamping member 48 serves as a single means for holding the case parts assembled, and the arcuate bottom 52 thereof also serves as a base upon which the instrument case rests. Likewise, the member 48 covers the indentations 4 in such manner as to completely hide from view the nuts 16.

The case member 2 may be provided with a groove 58, and the bezel member 36 may likewise be provided with a groove 60 for accommodating the C-shaped clamping member 48 so that when the case is completely assembled, the clamping member 48 will lie within the grooves in such manner that the outer surface of the clamping member will be flush with the outer surface of the case members. Of course, the grooves in the case members may be omitted if desired, in which case the clamping member will protrude above the otherwise smooth outer surface of the instrument case.

The form of the invention shown in Fig. 4 differs only slightly from that shown in Figs. 1, 2, 3, and 7, but it will be seen that in the form of the invention shown in Fig. 4, the case member 2 is provided with an indented flange 62, and the rear edge of the bezel member 36 is telescoped over the flange 62. The flange 62 in this instance serves as means for aligning the two case members 2 and 36, and the clamping member 48 serves to hold the two members assembled in the same manner as pointed out in relation to the construction of Figs. 1, 2, 3, and 7. When the flange 62 is provided upon the member 2 as shown in Fig. 4, the peripheral flange 24 of the dial member 22 may be omitted, since the purpose of the flange 24 is to align the case members 2 and 36.

A further slight modification of the previously referred to structure is shown in Fig. 5 wherein the flange 44 of the crystal 42 is bent over as indicated at 64. The bent-over portion 64 of the flange 44 serves as a means for aligning the case parts 2 and 36, and the flange 44 in the completely assembled structure bears against the dial member 22, which as in the Fig. 4 construction, has no peripheral flange.

A slightly modified form of clamping means is shown in Fig. 8 wherein the top part of the C-shaped clamp is bifurcated to provide two arms 66 and 68. The space between the arms 66 and 68 may be used to accommodate a knob such as 70, which knob may be either an entirely decorative feature or may be used to control some part of the instrument.

In Fig. 9 is shown a pair of resilient C-shaped members 72 and 74 which may, if desired, be substituted for the C-shaped clamp 48. If the two clamps 72 and 74 of Fig. 9 are used to hold the case parts together, said parts may be provided with grooves to accommodate the clamping members as are provided in the construction shown in Fig. 7 to accommodate the C-shaped clamp 48; or the clamping members 72 and 74 may merely be placed over the outer surface of the case members. It will be noted that the members 72 and 74 are provided with rounded indentations 76. These indentations 76 take the place of the indentations previously referred to as being in the rear case member, and as the clamping members are provided with indentations, it will, of course, be understood that case member 2 is not provided with indentations but that the nuts 16 or other holding means protrude from the surface of the back case member 2 and are received within the indentations 76 when the final assembly is made. It will readily be appreciated that the C-shaped clamp 48 may, if desired, be provided with indentations to accommodate the nuts 16 instead of providing the indentations 4 in the back case member 2. It will be noted from Fig. 9 that the members 72 and 74 are curved along their bottom portions as shown at 78 and 80 respectively, and that these curved portions 78 and 80 serve as a base upon which the instrument case rests in the same manner as the curved portion 52 of the member 48.

In Fig. 10 is shown an application of this invention involving a molded case. The instrument case shown in Fig. 10 consists of three major parts; namely, a back case member 82, a front or bezel member 84, and a bottom member 86. It is desirable to make the bottom member 86 separate from the back case member 82 for ease in molding the member 82. The instrument 88 is mounted within the case member 82 in the same manner as previously described in connection with the mounting of the instrument within the case member 2 and is held in place by the nuts 90 screwed upon the longitudinally extending ends 92 of the pillars 94. The dial member 96 and the bezel member 84 are identical with the bezel 36 and dial member 22 previously described, and the various parts are assembled in the same way as previously described. After the instrument has been mounted within the case and the dial member and bezel placed in position, the bottom member 86 may be inserted within the rear case member 82 and all of the parts are then clamped together by the C-shaped clamp 98. In this instance, the instrument case does not rest upon the bottom part 100 of the clamping member 98 but instead rests on the lower portion of the case member 82. The front and rear edges of the case member 82 are provided with notches to accommodate the rounded portion 100 of the member 98.

While the invention has been illustrated and described in its preferred embodiments and has included certain details, it should be understood that the invention is not to be limited to the precise details herein illustrated and described since the same may be carried out in other ways, falling within the scope of the invention as claimed.

What I claim is:

1. A two part instrument case wherein one of said parts has indentations in the normally flat outer surface thereof, openings in said indentations constructed and arranged to receive instrument supporting means, and means holding the two parts of the case assembled, said latter means also lying over the indentations in such manner as to completely cover said supporting means.

2. A two part instrument case wherein one of said parts has indentations in the normally flat outer surface thereof, openings in said indentations constructed and arranged to receive instrument supporting means, and a C-shaped member holding the two parts of the case assembled, said C-shaped member lying over the indentations in such manner as to completely cover said supporting means.

3. A two part instrument case wherein one of said parts has indentations in the normally flat outer surface thereof, openings in said indentations constructed and arranged to receive instrument supporting means, and means holding the two parts of the case assembled, said latter means lying over the indentations in such manner as to completely cover said supporting means and also being so constructed and arranged as to provide a base upon which said case rests.

4. A two part instrument case wherein one of said parts has indentations in the normally flat outer surface thereof, openings in said indentations constructed and arranged to receive instrument supporting means, and a C-shaped member holding the two parts of the case assembled, said C-shaped member lying over the indentations in such manner as to completely cover said supporting means and also being so constructed and arranged as to provide a base upon which said case rests.

5. An instrument case comprising a shell-like member having an open front and having indentations in the back thereof, said indentations being constructed and arranged to accommodate instrument positioning means, a bezel member, and means holding said shell-like member and said bezel member together, said means also lying over the indentations in the back of the shell-like member in such manner as to completely cover said positioning means.

6. An instrument case comprising a shell-like member having an open front and having indentations in the back thereof, said indentations being constructed and arranged to accommodate instrument positioning means, a bezel member, and a C-shaped clamping member holding said shell-like member and said bezel member together, said clamping member lying over the indentations in the back of the shell-like member in such manner as to completely cover said positioning means.

7. An instrument case comprising a shell-like member having an open front and having indentations in the back thereof, said indentations being constructed and arranged to accommodate instrument positioning means, a bezel member, and means holding said shell-like member and said bezel member together, said means lying over the indentations in the back of the shell-like member in such manner as to completely cover said positioning means and also being so constructed and arranged as to provide a base upon which said instrument case rests.

8. An instrument case comprising a shell-like member having an open front and having indentations in the back thereof, said indentations being constructed and arranged to accommodate instrument positioning means, a bezel member, and a C-shaped clamping member holding said shell-like member and said bezel member together, said clamping member lying over the indentations in the back of the shell-like member in such manner as to completely cover said positioning means and also being so constructed and arranged as to provide a base upon which said instrument case rests.

9. In instrument construction, a rear case member having a plurality of openings therein, an instrument having a pair of frame plates spaced apart by a plurality of pillars, said pillars having longitudinal extensions which are positioned within the openings in said rear case member, means for holding said extensions within said openings to thereby make the instrument fast with the rear case member, a dial member having a peripheral flange partly fitting telescopically within the forward part of said rear case member and having positioning means thereon engaged with one of the frame plates of the instrument, a front case member fitting telescopically over a portion of the peripheral flange of said dial member and juxtaposed said rear case member, and clamping means holding said case members assembled, said clamping means extending around the rear case member in such manner as to cover the openings in said rear case member.

10. In instrument construction, a rear case member having a plurality of openings therein, an instrument having a pair of frame plates spaced apart by a plurality of pillars, said pillars having longitudinal extensions which are positioned within the openings in said rear case member, means for holding said extensions within said openings to thereby make the instrument fast with the rear case member, a dial member having a peripheral flange partly fitting telescopically within the forward part of said rear case member and having positioning means thereon engaged with one of the frame plates of the instrument, a front case member fitting telescopically over a portion of the peripheral flange of said dial member and juxtaposed said rear case member, and clamping means for holding said case members assembled, said clamping means extending around the rear case member in such manner as to cover the openings in said rear case member and also being so constructed and arranged as to provide a base upon which said case rests.

(RALPH VIDAR) INGEMAR TAEGTSTROEM.

REFERENCES CITED

The following references are of record in the file of this patent:

UNITED STATES PATENTS

| Number | Name | Date |
| --- | --- | --- |
| 209,869 | Davies | Nov. 12, 1878 |
| 291,989 | Davies | Jan. 15, 1884 |
| 684,575 | Lane | Oct. 15, 1901 |
| 1,975,277 | Hodny | Oct. 2, 1934 |
| 2,039,672 | Whitehead | May 5, 1936 |
| 2,317,322 | Whitehead | Apr. 20, 1943 |
| 2,432,416 | Haydon | Dec. 9, 1947 |

FOREIGN PATENTS

| Number | Country | Date |
| --- | --- | --- |
| 30,757 | Switzerland | Jan. 9, 1904 |
| 47,813 | Switzerland | June 9, 1909 |
| 212,676 | Switzerland | Mar. 17, 1941 |
| 34,316 | Austria | Sept. 10, 1908 |
| 507,127 | Great Britain | June 9, 1939 |
| 727,118 | France | Mar. 21, 1932 |